(12) United States Patent
Pesetski et al.

(10) Patent No.: US 8,510,618 B1
(45) Date of Patent: Aug. 13, 2013

(54) ERROR CORRECTION IN QUANTUM COMPUTING SYSTEM

(75) Inventors: Aaron A. Pesetski, Gambrills, MD (US); James E. Baumgardner, Odenton, MD (US)

(73) Assignee: Northrop Grumman Systems Corporation, Falls Church, VA (US)

(*) Notice: Subject to any disclaimer, the term of this patent is extended or adjusted under 35 U.S.C. 154(b) by 272 days.

(21) Appl. No.: 13/109,595

(22) Filed: May 17, 2011

(51) Int. Cl.
- *H04L 1/00* (2006.01)
- *H01L 29/06* (2006.01)
- *H01L 29/08* (2006.01)

(52) U.S. Cl.
USPC .......................................... 714/746; 257/34

(58) Field of Classification Search
USPC ........... 714/746, 699, 724–725, 734; 257/34, 257/36, 39, 48
See application file for complete search history.

(56) References Cited

U.S. PATENT DOCUMENTS

| | | | |
|---|---|---|---|
| 7,307,275 B2 * | 12/2007 | Lidar et al. | 257/31 |
| 7,451,292 B2 * | 11/2008 | Routt | 712/14 |
| 8,073,808 B2 * | 12/2011 | Rose | 706/62 |
| 8,386,899 B2 * | 2/2013 | Goto et al. | 714/799 |

* cited by examiner

*Primary Examiner* — Christine Tu
(74) *Attorney, Agent, or Firm* — Tarolli, Sundheim, Covell & Tummino LLP

(57) ABSTRACT

Systems and methods are provided for performing a quantum error correction. An error correction is performed on each of a plurality of qubit sets restore a desired basis state of the qubit set. Each qubit set corresponds to an associated logical qubit. A number of corrected qubits at each of the plurality of qubit sets are recorded. A first set of the plurality of logical qubits having a first state and a second set of the plurality of logical qubits having a second state are determined. One of the first set of logical qubits and the second set of logical qubits are corrected according to the recorded numbers of corrected qubits.

20 Claims, 4 Drawing Sheets

US 8,510,618 B1

ERROR CORRECTION IN QUANTUM COMPUTING SYSTEM

FIELD OF THE INVENTION

The invention relates generally to quantum computers. More specifically, the invention relates to error correction in quantum computing systems.

BACKGROUND OF THE INVENTION

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g. high voltage) or a logical zero (e.g. low voltage). A classical algorithm, such as one that multiplies two integers, can be decomposed into a long string of these simple logic gates. Like a classical computer, a quantum computer also has bits and gates. Instead of using logical ones and zeroes, a quantum bit ("qubit") uses quantum mechanics to occupy both possibilities simultaneously. This ability means that a quantum computer can solve a large class of problems with exponentially greater efficiency than that of a classical computer.

SUMMARY OF THE INVENTION

In accordance with an aspect of the present invention, a method is provided for performing a quantum error correction. An error correction is performed on each of a plurality of qubit sets to restore a desired basis state of the qubit set. Each qubit set corresponds to an associated logical qubit of a plurality of logical qubits. A number of corrected qubits at each of the plurality of qubit sets are recorded. A first set of the plurality of logical qubits having a first state and a second set of the plurality of logical qubits having a second state are determined. One of the first set of logical qubits and the second set of logical qubits are corrected according to the recorded numbers of corrected qubits.

In accordance with another aspect of the present invention, a method is provided for quantum error correction. A first error correction is performed on each of a plurality of qubit sets. Each qubit set represents an associated logical qubit of a plurality of logical qubits. A first set of the plurality of logical qubits having a first state and a second set of the plurality of logical qubits having a second state are determined, with the first set of logical qubits being larger than the second set. The first set of logical qubits is corrected to the second state.

In accordance with still another aspect of the present invention, a system is provided for storing a quantum bit of interest. A quantum storage system includes a plurality of physical structures configured to collectively store a quantum bit of interest. A system control includes an error correction component configured to perform an error correction on each of a plurality of qubit sets. The qubit sets are stored in the plurality of physical structures and correspond to respective logical qubits of a plurality of logical qubits. A measurement arbitration component records a number of corrected qubits and associated types of the corrections at each of the plurality of qubit sets, determines a first set of the plurality of logical qubits having a first state and a second set of the plurality of logical qubits having a second state, and corrects one of the first set of logical qubits and the second set of logical qubits according to the recorded numbers of corrected qubits and associated correction types.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

The present invention relates generally to quantum computing systems, and specifically to assemblies for storing quantum information. As used herein, a resonator is a physical assembly having a plurality of quantum states that can be used to store all or a portion of a quantum bit of interest. For example, a resonator can be implemented as a transmission line, a resonant cavity, or any other structure appropriate for a given application. In general, a resonator will have a characteristic frequency that is constant, although it will be appreciated that a tunable resonator assembly can be used where required by a given application. A qubit cell is a physical assembly having a plurality of energy states that are tunable in response to a control mechanism. For example, the qubit cell can be implemented as an oscillator that can transfer energy between some combination of an electric field of a capacitor, a magnetic field of an inductor, and a superconducting phase difference. Exemplary implementations of a qubit cell can include one or more of a Josephson junction, a quantum dot, a SQUID (superconducting quantum interference device), a Cooper pair box, and an ion trap. To maintain consistent and unambiguous terminology, the term "qubit" will refer hereinafter to an item of quantum information stored in one or more resonators or qubit cells.

Each assembly can include a plurality of resonators configured to store quantum information and a plurality of qubit cells configured to manipulate the quantum information stored in the resonators. It will be appreciated that a given item of quantum information is not limited to a physical quantum state of a given resonator or qubit cell, but rather could represent a linear superposition of multiple physical quantum states of a resonator or qubit cell storing the information. It will further be appreciated that a given item of quantum information can be stored in multiple qubit cells and resonators and be represented by linear superpositions of the physical quantum states of each of the multiple qubit cells and resonators. Further, where any two components of the invention are described as "coupled," it will be appreciated that the term is intended to encompass not only a means of physical coupling, such as a mechanical coupling by means of an electrical conductor, but also any other appropriate coupling means including capacitive, inductive, magnetic, nuclear, and optical coupling, or any combination of the foregoing.

Figure 1:
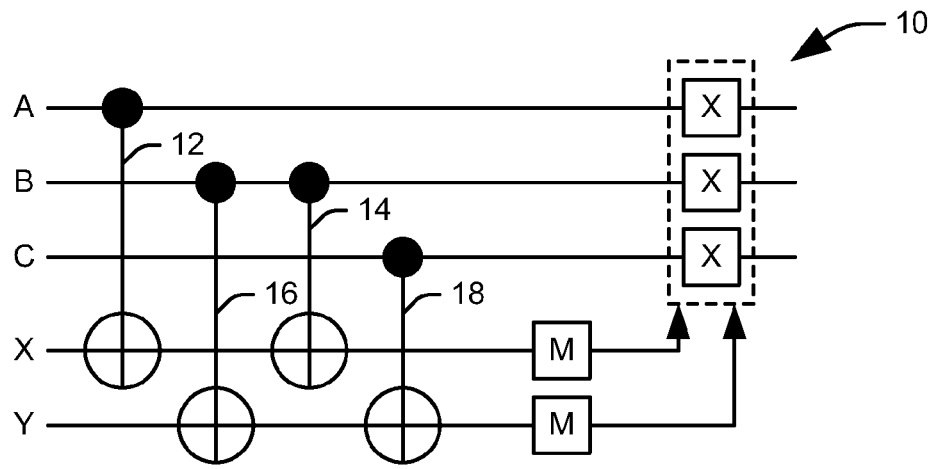
FIG. 1 illustrates a quantum circuit for correcting a set of qubits.

FIG. 1 illustrates one example of a quantum circuit 10 for correcting a set of qubits. A quantum error correction system in accordance with an aspect of the present invention uses a set of individual qubits to encode a single quantum state, making the quantum information less susceptible to errors. Throughout this application, we refer to any qubit encoded as a plurality of other qubits as a logical qubit. It will be appreciated that the quantum error correction system can be concatenated, such that a given higher-level logical qubit can be encoded as a plurality of lower level logical qubits, which are themselves each encoded as a plurality of individual qubits or even lower level logical qubits. For example, assume that a qubit is stored in a state $|\Psi\rangle = \alpha|0\rangle + \beta|1\rangle$ as part of a quantum computation. $|0\rangle$ and $|1\rangle$ represent computational basis states and $\alpha$ and $\beta$ are amplitudes of their corresponding basis states, that is, complex numbers which describe the state relative to the basis states. An error is represented by a change in the coefficients $\beta$ and $\beta$. For example, noise in the system may cause the stored qubit to change to a state $|\Psi'\rangle = \alpha'|0\rangle + \beta'|1\rangle$. If only a single qubit is used, all information about the original state is lost. However, by using multiple qubits to encode the state, that information can be recovered.

In one example, three qubits can be used to encode the state, such that the state can be represented as $|\Psi\rangle = \alpha|000\rangle + \beta|111\rangle$. $|000\rangle$ and $|111\rangle$ are two of the eight basis states available with three qubits, the others being $|001\rangle$, $|010\rangle$, $|011\rangle$, $|100\rangle$, $|101\rangle$, and $|110\rangle$. It will be appreciated, however, that other encoding schemes can be utilized in which other basis states are selected to encode the state. If noise caused one of the qubits to drift, say the first qubit, the state changes to $|\Psi'\rangle = \alpha'|000\rangle + \epsilon|100\rangle + \beta'|111\rangle + \delta|011\rangle$. Determination of the coefficients $\delta$ and $\epsilon$ would allow the type of error that occurred in the qubit to be ascertained and the original state to be recovered.

Unfortunately, the coefficients, $\delta$ and $\epsilon$, cannot be measured directly and the amplitudes, $\alpha$ and $\beta$, are complex numbers so changes in the phase of the first amplitude, $\alpha$, relative to a second amplitude, $\beta$, cannot be determined by the above prescription. The second difficulty can be overcome by using an alternate encoding technique. For example, the quantum state can instead be encoded as $|\Psi\rangle = \alpha(|0\rangle+|1\rangle)(|0\rangle+|1\rangle)(|0\rangle+|1\rangle) + \beta(|0\rangle-|1\rangle)(|0\rangle-|1\rangle)(|0\rangle-|1\rangle)$, allowing errors in the phase to be determined. More sophisticated coding techniques can be used to allow errors in both phase and amplitude to be determined simultaneously. For example, nine qubits can be used to encode the state, with the quantum state encoded as $|\Psi\rangle = \alpha(|000\rangle+|111\rangle)(|000\rangle+|111\rangle)(|000\rangle+|111\rangle) + \beta(|000\rangle-|111\rangle)(|000\rangle-|111\rangle)(|000\rangle-|111\rangle)$, which allows for detection and correction of both phase and amplitude errors.

The first difficulty mentioned above, the inability to directly measure $\delta$ and $\epsilon$, is overcome through the use of additional, ancillary qubits. Referring to FIG. 1, the three qubits labeled A, B, and C are the storage qubits used to encode the logical qubit, while the two qubits labeled X and Y are ancillary qubits used to determine errors. The two ancillary qubits, X and Y, are initialized into the state $|0\rangle$. In the illustrated quantum circuit 10, first and second controlled NOT (CNOT) gates 12 and 14 are performed on the first ancillary qubit, X. The first CNOT operation 12 uses the first storage qubit, A, as a control, and the second CNOT operation 14 uses the second storage qubit, B, as a control, such that the net effect of these gates is to store in X the difference in amplitude between qubits A and B. Third and fourth controlled NOT (CNOT) gates 16 and 18 are performed on the second ancillary qubit, Y. The third CNOT operation 16 uses the second storage qubit, B, as a control, and the fourth CNOT operation 18 uses the third storage qubit, C, as a control, as to store in Y the difference in amplitude between qubits B and C.

The ancillary qubits, X and Y, are then measured to determine if the qubit state stored in any of the storage qubits, A, B, and C, has changed. For example, if a slight rotation in qubit A has introduced an error, then when ancillary qubit X is measured it will have a probability of being in the $|1\rangle$ state, indicating that an error occurred. More importantly, since the CNOT gates entangle the X qubit with the other qubits, measurement of a $|0\rangle$ state projects the state of the three storage qubits, A, B, and C, back into their original state. A measurement of a $|1\rangle$ state projects the state of the three qubits A, B, and C into the state $|\Psi\rangle = \alpha|100\rangle + \beta|011\rangle$. It will be appreciated that the qubit state can be corrected by performing an X gate on qubit A.

In general, it will not be known which qubit, A or B, contained the error. Thus, it is necessary, in a three qubit system, to use two ancillary qubits. By measuring both ancillary qubits, it is possible to determine which qubit, if any, differs from the other two qubits, and thus can be assumed to contain the error. Where both ancillary qubits, X and Y, are measured to be in the $|0\rangle$ state, all three qubits are in agreement and it is likely that no error is present. If X is measured to be in the $|1\rangle$ state and Y is measured to be in the $|0\rangle$ state, qubit A is in a different state than qubit B, but qubits B and C are in the same state, indicating that the error is in qubit A. If X is measured to be in the $|0\rangle$ state and Y is measured to be in the $|1\rangle$ state, qubit C is in a different state than qubit B, but qubits B and A are in the same state, indicating that the error is in qubit C. If both ancillary qubits, X and Y, are measured to be in the $|1\rangle$ state, qubit B is in a different state from each of qubit A and qubit C, indicating that the error is in qubit B.

The illustrated quantum circuit 10 accepts the state common to any two of the three qubits to correct amplitude errors. It will be appreciated that the illustrated quantum circuit is merely an example, and that other error correction algorithms can use different quantum states to encode the quantum information and different error extraction procedures (e.g., a different set of ancillary qubits and gating operations to extract which errors were made), and a system in accordance with an aspect of the present invention can utilize any correction process based upon the principle of comparing multiple qubits, determining which ones are inconsistent with an expected basis state, and manipulating those qubits to correct the errors.

One assumption of this approach is that errors are uncorrelated, that is, an error in a first qubit does not cause errors in other qubits. Further, it is assumed that the probability of an error occurring is small so that the probability of two errors occurring is much smaller. For example, in the illustrated quantum circuit, if the probability of an error occurring in a given qubit in a period of time, t, is p, then the probability of one of the three qubits having an error in time t is $3p(1-p)^2 \sim 3p$. The probability of two or more qubits having an error is $3p^2(1-p)+p^3 \sim 3p^2$. If p is very small, then the probability of two or more errors is about p times smaller than the probability of a single error. It will be appreciated that, once two or more errors occur, the error correction algorithm will fail. The net effect of error correction is thus to extend the lifetime of the qubit, not to make it immune to error. In this case, the mean time between errors for an uncorrected qubit is t/p, while the mean time between errors for the corrected qubit is about $t/p^2$.

Figure 2:
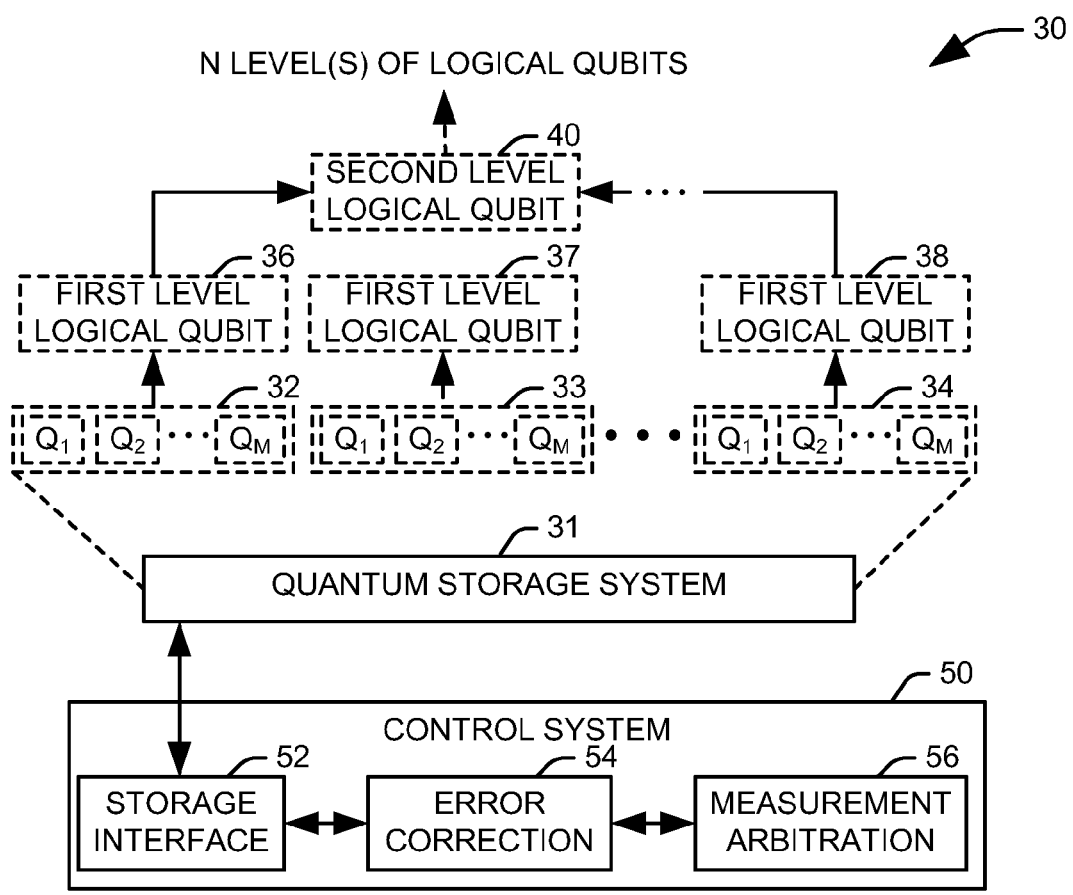
FIG. 2 illustrates a functional representation of an error correction system for storing a quantum bit of interest in accordance with an aspect of the present invention.

FIG. 2 illustrates a functional representation of an error correction system 30 for storing a qubit of interest in accordance with an aspect of the present invention. The system 30 utilizes a compound error correction algorithm to store the qubit of interest in a quantum storage system 31 comprising a plurality of physical structures configured to store individual qubits collectively representing a quantum bit of interest, such that the qubit of interest is a logical qubit, as defined previously. For example, the plurality of physical structures can include a plurality of resonators and a plurality of qubit cells, with each of the plurality of resonators selectively coupled to at least one of the plurality of qubit cells such that quantum information can be passed freely among the plurality of resonators and the plurality of qubit cells. In the illustrated error correction system, the quantum bit of interest is stored redundantly within the plurality of physical structures as a plurality of individual qubits. The individual qubits are divided into discrete qubit sets 32-34, allowing any errors in the stored qubits in a given set to be corrected via an appropriate error correction algorithm, such as the quantum circuit described in FIG. 1, at a first level of error correction. A logical qubit represented by each qubit set, referred to as first-level logical qubits, can then be corrected in a similar manner as part of a concatenation process. It will be appreciated that each qubit of the qubit sets 32-34, while stored in the physical structures, represent logical qubits 36-38, and the qubits in a given qubit set need not be stored in proximity to one another. In fact, it will be expected that the physical location of each qubit may change during the error correction procedure. In a concatenation process, each of r qubit sets 32-34 can be corrected by respective error correction algorithms to maintain the individual qubits in a given qubit set in their respective states as to maintain a desired state of the qubit set. It will further be appreciated that the quantum storage system 31 may include other physical qubits that may be used, in combination with the qubit sets, to provide the error correction for the logical qubits 36-38.

For example, the error correction algorithm can use a set of m qubits, having a probability of error of p over a time t, to create a single logical qubit, reducing the probability of an error occurring during a time t from p to $p^n$, where $n=(m+1)/2$. A second error correction algorithm can then be applied across the r logical qubits 36-38 represented by the qubit sets 32-34, as to maintain a second-level logical qubit 40, formed from the r logical qubits, in a desired state. The concatenation of the two algorithms will use rom qubits to create a single logical qubit 40 which, without other refinement, reduces the probability of an error occurring during time t from $p^n$ to $p^{nq}$, where $q=(r+1)/2$. Accordingly, each of the qubit sets 32-34 represents a first level of error correction, and the lifetime of each first-level logical qubits can be estimated as $t/p^n$. The second algorithm represents a second level of error correction applied across the first set of logical qubits, and applied in the most straightforward manner, can increase the lifetime of the second level logical qubit to $t/p^{nq}$.

As an example, the second-level logical qubit 40 can be constructed by concatenating two levels of a best two out of three amplitude error correction circuit as described in FIG. 1. For the purpose of example, it can be assumed that each qubit set 32-34 contains three qubits and that there are three qubit sets, and thus three corresponding first level logical qubits. For example, a first logical qubit 36 can be corrected by comparing the first set of qubits 32 and correcting the qubit, if any, that differs in state from the other two qubits. This process is repeated for the other first-level logical qubits 33 and 34. Once each of the first-level logical qubits 36-38 has been corrected, the second-level logical qubit 40 is corrected by comparing the first-level logical qubits 32-34 and determining which one is in error.

In a naïve process, the decision about which qubit to correct would be based solely on which first-level logical qubit is different, and would be effective as long as there are less than four errors in the nine qubits comprising the first level logical qubits 36-38. Using this algorithm, the illustrated system 30 reduces the probability of error in the stored qubit 40 from p to $p^4$, as the correct state is obtained if the underlying physical qubits in the qubit sets 32-34 make less than four errors. For example, if a single qubit is in error, it will be corrected by the first-level error correction algorithm associated with the qubit set (e.g., 32) to which the qubit belongs. If two errors occur, they will be corrected by the first-level error correction algorithm if they occur in different qubit sets and by the second-level error correction if the two errors occur in the same logical qubit.

There are three ways in which three errors can occur in the example system. In the simplest case, each error can occur in a distinct qubit set, in which case the first-level error correction algorithm will correct each of them. Alternatively, all three errors can occur in the same first level logical qubit, in which case the first-level error correction algorithm will fail, but the error will be corrected by the second-level error correction algorithm. Finally, there can be one error in a first first-level logical qubit (e.g., 36) and two errors in a second first-level logical qubit (e.g., 37). In this case, the first-level error correction algorithm will correct the first logical qubit 36, but will fail to correct the second logical qubit 37. However, since only one of the first-level logical qubits 36-38 will have an error, the second-level error correction algorithm will still correct the error. Since there are no other ways for three or fewer errors can occur, it is clear that the concatenated amplitude error correction algorithm succeeds whenever there are fewer than four errors.

There are three ways in which four errors can occur in the concatenated two out of three amplitude error correction algorithm. In a first case, the three qubits comprising one first-level logical qubit (e.g., 36) are in error, along with one qubit in another first-level logical qubit. (e.g., 37) In a second case, two qubits in one of the first-level logical qubits (e.g., 36) are in error, and one qubit in each of the other two logical qubits (37 and 38) is in error. In these cases, the first-level error correction algorithm will correct the first-level logical qubits with only one error, while the second-level error correction algorithm will correct the logical qubit with multiple errors. In the third case, however, two first-level logical qubits (e.g., 36 and 37) each contain two errors. In this case, the first-level error correction will fail for each of these logical qubits. Since two of the three first-level logical qubits 36-38 are in error, the second-level error correction will determine that the two erroneous logical qubits are in agreement and alter the logical qubit with no errors, causing the naïve algorithm to fail.

In accordance with an aspect of the present invention, information about errors corrected within the first-level logical qubits 36-38 can be retained and used to make more intelligent decisions about how to correct errors in the second-level logical qubit 40. In the illustrated implementation, the operations performed at the first level of error correction can be recorded at a control system 50 associated with the quantum storage system 31. For example, the control system can be implemented as machine-readable instructions on a classical computer system. The control system 50 includes a storage interface 52 configured to allow the control system 50 to alter respective energy states of qubits within the quantum storage system 31. For example, the storage interface 52 can digitally control one or more classical control mechanisms (not shown) to manipulate respective classical control parameters associated with the qubit cells in the quantum storage system 31 and provide data representing quantum states measured in the qubits to the control system.

An error correction component 54 is configured to perform an error correction on each of the plurality of qubit sets used to store the quantum bit of interest to place each qubit in a given qubit set in the same state. For example, each qubit in a given qubit set can be entangled with one or more of a set of ancillary qubits and the ancillary qubits can then be measured. The measurements recorded for the ancillary qubits can be compared to a known truth table to determine any disagreement among the states of the qubits. The correction is then performed by majority vote, with the one of the first set of qubits and the second set of qubits having fewer qubits being corrected to the state associated with the other set.

A measurement arbitration component 56 is configured to receive and record the measurement data associated with the first-level error correction and the results of comparative measurements between the first-level logical qubits 36-38 and determine an appropriate correction, if any, to apply at the second level of error correction. By the term "comparative measurements", it is intended to refer to any measurements taken of qubits entangled with one or more of the first-level logical qubits 36-38 capable of revealing differences in quantum state among the first-level logical qubits from respective desired states. In the illustrated example, using the quantum circuit of FIG. 1, the comparative measurements would be the measurements of the two ancillary qubits, X and Y, once they have been entangled with the first-level logical qubits 36-38 as described above. In an implementation using basis states in which all of the qubits in each qubit set 32-34 are in the same state, any qubit from a given qubit set (e.g., 32) can be used as a representative qubit for its associated first-level logical qubit (e.g., 36) in generating the comparative measurements. Where other basis states are used, more complex systems, using sets of one or more representative qubits, can be used for the higher-level error corrections.

The measurement arbitration component 56 is configured to evaluate the measurements associated with first-level error correction to guide the correction applied at the second level of error correction. Specifically, a level of confidence associated with each of the first-level logical qubits 36-38 can be determined from the number of qubits corrected at the first-level of error correction, as well as the associated types of the corrections, and used to perform the correction of the second-level logical qubit with more accuracy. In one implementation, the measurement arbitration component 56 can utilize a series of logical rules, with one or more rules based on the number of qubits corrected in each set of qubits on the first level. Alternatively, the measurement arbitration component 56 can assign a weight to each first-level logical qubit 36-38 according to the number of qubits corrected, and the appropriate correction can be determined according to a weighted voting scheme, with the weight for each set calculated as a linear combination of the weights associated with the logical qubits comprising the set. For example, the weights can be based on the conditional probability that the measurement would be obtained given a state of the logical qubit. It will be appreciated that other methodologies, such as appropriate classification or arbitration schemes, can be used to guide the second and subsequent levels of error correction.

In the example given previously, using three qubits in each qubit set 32-34 and three qubit sets, the measurement arbitration component 56 uses a rule-based approach, in which the determination of which first-level logical qubits 36-38 to correct is determined according to a series of logical rules. For that case, the rule set can be summarized as a majority voting scheme at the first level of error correction, and a modified majority voting scheme at the second level of error correction. At the second level of error correction, where one first-level logical qubit (e.g., 36) is found to have a state different than the other two first-level qubits 37 and 38, the one qubit will be corrected unless both of the qubit sets 33 and 34 associated with the other two first-level qubits contained an error and had a qubit corrected at the first level of error correction. In that instance, if the qubit set 32 associated with the one first-level logical qubit did not require any corrections, the two first-level qubits 37 and 38 are corrected instead. It will be appreciated that this implementation of the second-level error correction does not alter the course of action take in any of the cases where the majority voting scheme would have succeeded, but it does correct the situation with four errors in which the majority voting scheme fails. As the example implementation of the measurement arbitration component 56 corrects all cases where fewer than five of the nine qubits comprising the qubit sets 32-34 are in error, it reduces the probability of an error occurring from p to $p^5$, and increases the lifetime of the stored bit of quantum information by a factor of 1/p over the majority voting scheme.

It will be appreciated that the error correction system 30 is generally applicable to qubit sets of any size, any number of logical qubits at each level of the concatenation, and any number of levels of concatenation. In the specific example discussed above, the only check that was necessary was to determine if the first-level logical qubit identified as differing in state from the other two first-level qubits as being in error had an error corrected in its qubit set in the first level of error correction. In general, in formulating a set of logical rules, an error threshold will be established at each level of concatenation. Essentially, the algorithm can check to see if the logical qubit or qubits at a given level of concatenation that are identified for correction contained more than a threshold, t, errors during a previous level of error correction. If so, they are corrected. If not, the other qubits are corrected. The exact value for t can be determined by performing a detailed analysis of which combinations of errors cause the concatenated algorithm in question to fail.

The amount by which this invention increases the logical qubit lifetime depends on the specifics of the error correction algorithms used to generate the concatenated error correction algorithm, and can vary with the number of qubits in each set, the number of logical qubits at each level of concatenation, and the number of levels of concatenation. For example, an error correction algorithm generated by concatenating three levels of the best two out of three error correction algorithm via the majority voting arrangement would reduce the probability of generating an error in a time t from p to $p^8$ and thus increase the qubit lifetime from t/p to $t/p^8$. Application of a modified error correction system in accordance with an aspect of the present invention to the same algorithm would reduce the probability of generating an error in time t from p to $p^{14}$ and subsequently increase the qubit lifetime from t/p to $t/p^{14}$, an improvement of $1/p^6$ over the majority voting approach.

Figure 3:
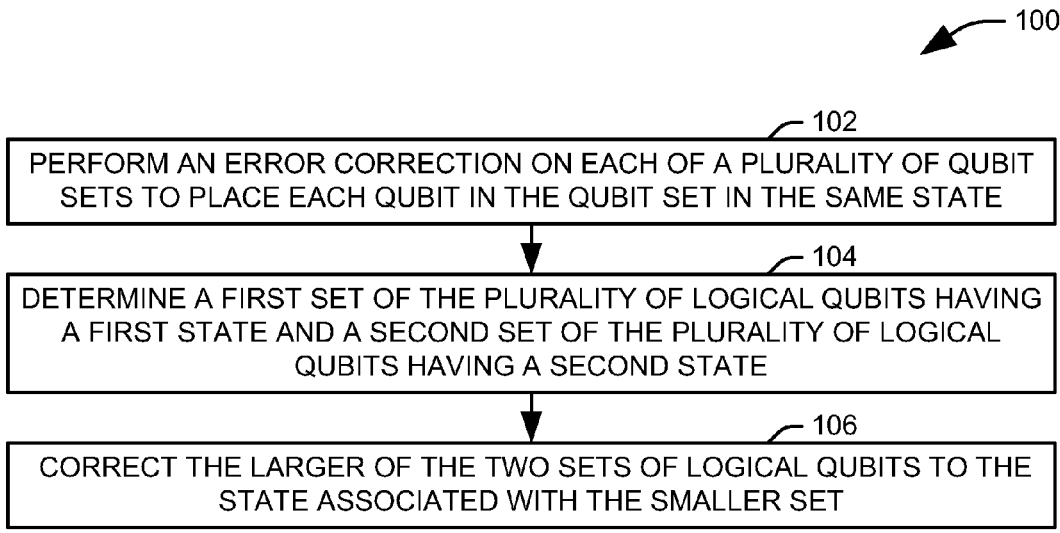
FIG. 3 illustrates a first instance of a method for performing a quantum error correction in accordance with an aspect of the present invention.
Figure 4:
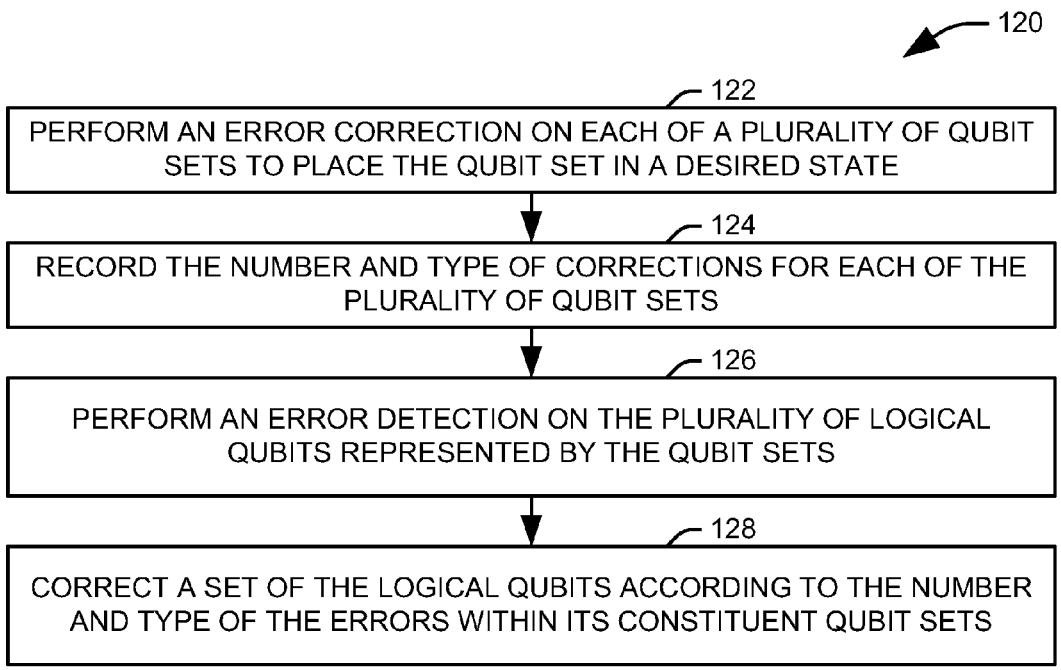
FIG. 4 illustrates an example of a method for performing a quantum error correction in accordance with an aspect of the present invention.

In view of the foregoing structural and functional features described above, example methodologies will be better appreciated with reference to FIGS. 3 and 4. While, for purposes of simplicity of explanation, the methodologies of FIGS. 3 and 4 are shown and described as executing serially, it is to be understood and appreciated that the present invention is not limited by the illustrated order, as some actions could, in other examples, occur in different orders from that shown and described herein or could occur concurrently.

FIG. 3 illustrates an example instance of a method 100 for performing a quantum error correction in accordance with an aspect of the present invention. At 102, a first error correction is performed on each of a plurality of qubit sets, with each qubit set representing an associated logical qubit of a plurality of logical qubits. In accordance with an aspect of the present invention, the number of qubits corrected in each qubit set can be recorded. At 104, a first set of the plurality of logical qubits having a first state and a second set of the plurality of logical qubits having a second state can be determined, with one set of logical qubits being larger than the other set. For example, this can be accomplished by entangling one or more qubits from each qubit set with at least one of a set of ancillary qubits and measuring each of the set of ancillary qubits. At 106, the larger of the two sets of logical qubits are corrected to the state associated with the smaller set. For example, in the illustrated instance, it can be determined at 104 that a confidence value associated with each of the logical qubits in the smaller set is significantly higher than respective confidence values of the logical qubits in the larger set. As described in detail previously, this determination can be accomplished via a set of logical rules designed for a specific error correction system. Accordingly, the illustrated instance departs from a majority rule approach and corrects the larger of the two sets of logical qubits.

FIG. 4 illustrates an example of a method 120 for performing a quantum error correction in accordance with an aspect of the present invention. At 122, an error correction is performed on each of a plurality of qubit sets. Each qubit set represents an associated logical qubit. In one implementation, the error correction on a given qubit set can be performed by entangling one or more qubits from the set with one or more of a set of ancillary qubits, that is, qubits that are not part of the plurality of qubit sets, and the ancillary qubits can be measured. The measurements recorded for the ancillary qubits can be compared to a known truth table to determine the corrective action required. Since the correct state of the qubit is unknown, the corrective action generally requires a majority vote of some set of the measurements made. The correction, a series of quantum gates, is then performed on the qubit set to return the qubits to a desired state. At 124, the number of corrected qubits and type of correction at each of the plurality of qubit sets is recorded. For example, the correction can include correction of a bit-flip error, a phase error, or an energy relaxation error. At 126, an error detection is performed on the plurality of logical qubits. The error detection can be performed by entangling one or more logical qubits with one or more of a set of ancillary qubits, which can then be measured and recorded.

At 128, a set of the logical qubits is corrected according to the measurements made at 126 and the recorded numbers and types of qubit corrections at 124. For example, the set of logical qubits to be corrected can be selected according to a set of logical rules, with one or more of the logical rules evaluating a number of corrected qubits recorded at one of the qubit sets. In one implementation, with three qubit sets, each containing three qubits, the set of logical rules can use a modified majority voting approach, in which a given set of logical qubits is selected for correction if it contains only one logical qubit unless the qubit set associated with the one logical qubit contained no corrected qubits and each of the remaining two qubit sets contained a corrected qubit.

Alternatively, the set of logical qubits to be corrected can be determined via a weighted voting approach. In this approach, a weight can be assigned to each logical qubit according to the recorded number of corrected qubits at its corresponding qubit set. The weights can be precomputed for a given system and assigned according to the number and types of corrections required for each set. For example, the weight can be computed as a function of a probability of that the corrected logical qubit is in the wrong state given the number and type of corrections and the known likelihood of each type of error in a given qubit within a qubit set. The weights associated with each logical qubit can then be ranked, and the qubits with the highest weights corrected.

It will be appreciated that the method 120 can be extended to concatenation schemes having more than two levels of error correction. For example, the plurality of logical qubits described herein can simply be a first set of first-level logical qubits of a plurality of sets of first-level logical qubits. In a third level of error correction, the number and types of errors corrected in the first-level logical qubits at each set of first-level logical qubits can be recorded for an associated second-level qubit. The second-level logical qubits containing errors can be determined in a manner similar as the determination at 126. A set of second-level logical qubits can then be corrected according to the recorded numbers of corrected first-level logical qubits, in a manner similar to the correction at 128.

Figure 5:
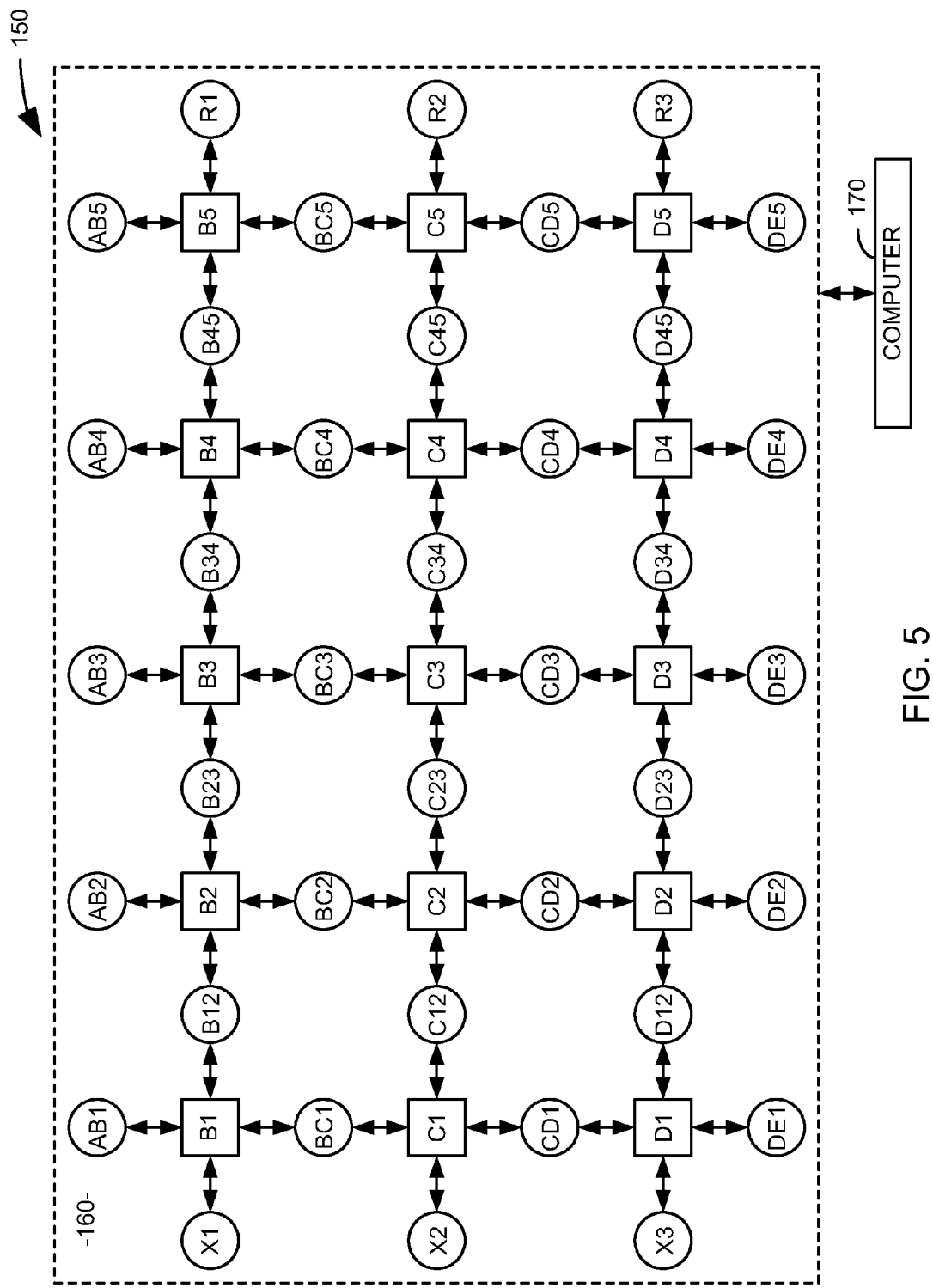
FIG. 5 illustrates an exemplary system that could be used to perform methodologies in accordance with an aspect of the present invention.

FIG. 5 illustrates an exemplary system 150 that could be used to perform methodologies in accordance with an aspect of the present invention. The system 150 includes a quantum processor 160 comprising a plurality of resonators B1-B5, C1-C5, and D1-D5, each configured to store all or a portion of the quantum information comprising a qubit. Each of the plurality of resonators can be configured as transmission line resonators, lumped element resonators, distributed resonators, or a combination thereof. Each of the plurality of resonators can have an associated characteristic frequency, with a first set B1, B3, B5, C2, C4, D1, D3, and D5 of the plurality of resonators having a first associated frequency (e.g., 10 GHz) and a second set B2, B4, C1, C3, C5, D2, and D4 of the plurality of resonators can having a second associated frequency (e.g., 15 GHz).

The quantum processor 160 further comprises a plurality of qubit cells AB1-AB5, BC1-BC5, CD1-CD5, DE1-DE5, B12-D12, B23-D23, B34-D34, B45-D45, X1-X3, and R1-R3 configured to perform logical operations on the stored qubits. In the illustrated implementation, each of the qubit cells can be implemented as one or more of Josephson junction, a quantum dot, a SQUID (superconducting quantum interference device), a Cooper pair box, or an ion trap. Each qubit cell can be coupled to one or more resonators, such that the resonators and the qubit cells, taken collectively, can be used to perform logical operations on a qubit.

In normal operation, all of the qubits are kept in their ground state and quantum information in stored in some fraction of the resonators. Quantum information can be routed from one resonator to another by picking any route through empty resonators to perform quantum gate operations. For example, if quantum information were stored only in the resonators of the second and fourth column, quantum information could be routed from B2 to D4 by sweeping qubit B23 to transfer the state from B2 to B3. Next, sweep BC3 to transfer to C3, sweep CD3 to transfer to D3, and finally, sweep D34 to transfer to D4. It is possible to transfer quantum information through a resonator even if it already contains another piece of quantum information. Multiple qubit quantum gates can be performed by transferring quantum information into two qubits connected to the same resonator and using the sequences of sweeps and jumps as described in U.S. Pat. No. 7,498,832 and an application titled "Quantum Processor Assembly."

The plurality of qubit cells can include multiple types of qubit cells, each having a different structure and optimized for a different function. For example, a first set of qubit cells X1-X3 can be optimized for performing a quantum rotation, such as a Hadamard gate or an X gate operation, on a coupled resonator (e.g., B1-D1). To this end, each of the first set of qubit cells is configured to have a set of energy states that can be modeled as the state of a spin-½ particle, with associated "spin-up" and "spin-down" states that interact differently with an associated classical control parameter. In one implementation, the first set of qubit cells can be constructed as a superconducting flux qubit.

The second set R1-R3 of qubit cells can be configured to be read to determine the state of one or more qubits stored in the quantum processor 160. For example, the second set of qubit cells can include appropriate support equipment for allowing a high fidelity read operation from the qubit cells. It will be appreciated, however, that various systems and methods in accordance with an aspect of the present invention can be used to compensate for a low fidelity read operation, and thus alternative implementations of the second set of qubits are possible. The third set AB1-AB5, BC1-BC5, CD1-CD5, DE1-DE5, B12-D12, B23-D23, B34-D34, B45-D45 of qubit cells can be optimized for use in multiple qubit logical gate operations. To this end, each of the third set of qubit cells can be implemented, for example, as a single Josephson junction. In one implementation, the third set can each be implemented as a superconducting phase qubit.

The processor can further include a conventional computer system 170 that is configured to tune each of the plurality of qubit cells along their respective frequency ranges and monitor the location of quantum information within the processor. The conventional computer system 170 is configured to provide respective control signals to a plurality of classical control mechanisms (not shown) associated with the plurality of qubit cells as to adjust their associated frequencies and corresponding energy states. In addition, the conventional computer system 170 tracks the stored location of quantum information within the processor 160, allowing information to be quickly retrieved when it is needed for a logical gate. For example, information stored in one set of resonators can be moved to resonators near one or more specialized qubit cells to allow a specific logical operation to be performed.

In a methodology in accordance with an aspect of the present invention, the stored qubit will be stored in a plurality of resonators, as the resonators generally have coherence time superior to that of qubit cells, and the remaining qubit cells and resonators are left in their ground states to avoid any interference with the transfer of the stored data. When the error correction process is performed, the stored qubit is transferred from the resonators in which it is stored into respective qubit cells, and the CNOT gates described in the error correction process of FIG. 1 can be performed using the qubit cells and resonators, with the ancillary qubits measured at the qubit cells R1-R3 optimized for measurement. Any corrections of qubit states can be performed at the qubit cells X1-X3 optimized for performing X-gate operations. As described previously in FIG. 2, an error correction process in accordance with an aspect of the present invention can be executed at the classical computer 170.

Figure 6:
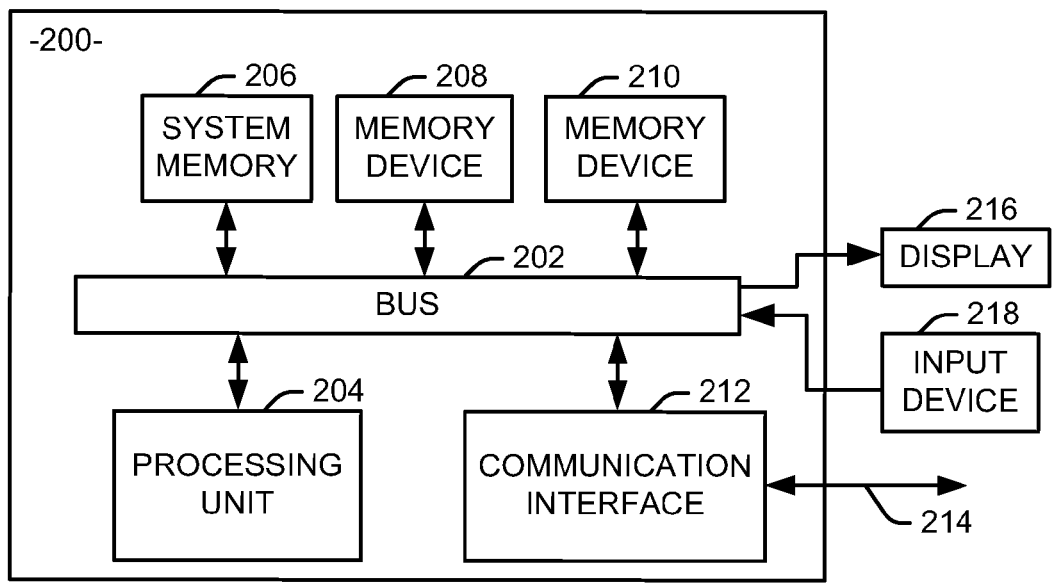
FIG. 6 illustrates an example of a computer system that can be employed in the implementation of the systems and methods illustrated in FIGS. 1-5.

FIG. 6 is a schematic block diagram illustrating an exemplary system 200 of hardware components that can be used as part of the implementation of systems and methods in accordance with aspects of the present invention as disclosed in FIGS. 1-5. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core. The term "computer readable medium" as used herein refers to a non-transitory medium that participates in providing instructions to the processing unit 204 for execution.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in different human. Additionally or alternatively, the system 200 can access an external data source or query source through the communication interface 212, which can communicate with the system bus 202 and the communication link 214.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A method for performing a quantum error correction comprising:
   performing an error correction on each of a plurality of qubit sets to restore a desired basis state of the qubit set, each qubit set corresponding to an associated logical qubit of a plurality of logical qubits;
   recording a number of corrected qubits at each of the plurality of qubit sets;
   determining a first set of the plurality of logical qubits having a first state and a second set of the plurality of logical qubits having a second state; and
   correcting one of the first set of logical qubits and the second set of logical qubits according to the recorded numbers of corrected qubits.

2. The method of claim 1, wherein correcting a plurality of logical qubits according to the recorded numbers of corrected qubits comprises:
assigning a weight to each logical qubit according to the recorded number of corrected qubits at its corresponding qubit set and an associated type of error corrected at each corrected qubit;
ranking the plurality of logical qubits by weight; and
correcting at least one logical qubit having the highest weight.

3. The method of claim 2, wherein assigning a weight to each logical qubit comprises computing the weight as a function of a probability of that the corrected logical qubit is in the wrong state given a number and type of corrections of qubits within the logical qubit and a known likelihood of each type of error.

4. The method of claim 1, wherein correcting a plurality of logical qubits according to the recorded numbers of corrected qubits comprises selecting at least one of the first set of logical qubits and the second set of logical qubits according to a set of logical rules, at least one of the logical rules evaluating a number of corrected qubits recorded at one of the qubit sets.

5. The method of claim 1, wherein the plurality of qubits sets each contain three qubits, and the set of logical rules comprises correcting one of the first and second sets of logical qubits that contains only one logical qubit unless the qubit set associated with the one logical qubit contained no corrected qubits and each of the remaining two qubit sets contained a corrected qubit.

6. The method of claim 1, the plurality of logical qubits comprising a first set of first-level logical qubits of a plurality of sets of first-level logical qubits, the method further comprising:
recording a number of corrected first-level logical qubits at each set of first-level logical qubits, each set of first-level logical qubits corresponding to an associated second-level qubit;
determining a first set of second-level logical qubits having a first state and a second set of second-level logical qubits having a second state;
correcting one of the first set of second-level logical qubits and the second set of second-level logical qubits according to the recorded numbers of corrected first-level logical qubits.

7. The method of claim 1, wherein determining a first set of the plurality of logical qubits having a first state and a second set of the plurality of logical qubits having a second state comprises entangling a qubit from each qubit set with at least one of a set of ancillary qubits that are not part of the plurality of qubit sets and measuring each of the set of ancillary qubits.

8. The method of claim 1, wherein performing an error correction on a qubit set of the plurality of qubit sets comprises:
determining a first set of qubits from a plurality of qubits in the qubit set having a first state and a second set of qubits from the plurality of qubits having a second state; and
correcting the one of the first set of qubits and the second set of qubits having fewer qubits.

9. A system for storing a quantum bit of information, the system comprising:
a quantum storage system comprising a plurality of physical structures configured to collectively store a quantum bit of interest as a plurality of qubits; and
a system control comprising:
an error correction component configured to perform an error correction on each of a plurality of qubit sets formed from the plurality of qubits, the qubit sets corresponding to respective logical qubits of a plurality of logical qubits; and
a measurement arbitration component that records a number and type of errors at each of the plurality of qubit sets and an associated type of each correction, determines a plurality of sets of logical qubits having respective associated states and corrects one of the plurality of sets of logical qubits according to the recorded numbers of corrected qubits and the recorded types of corrections associated with the logical qubits comprising each of the plurality of sets.

10. The system of claim 9, the system control further comprising a storage interface configured to allow the control system to alter respective energy states of qubits from the plurality of qubit sets stored within the plurality of physical structures.

11. The system of claim 9, wherein the plurality of physical structures comprises a plurality of resonators and a plurality of qubit cells, each of the plurality of resonators being selectively coupled to at least one of the plurality of qubit cells such that quantum information can be passed freely among the plurality of resonators and the plurality of qubit cells.

12. The system of claim 9, wherein the measurement arbitration component corrects one of the plurality of sets of logical qubits according to a weighted voting algorithm, each of a plurality of weights in the weighted voting algorithm being a function of a recorded number of corrected qubits at an associated qubit set, and a weight associated with each of the plurality of sets of logical qubits comprising a linear combination of the weights associated with the logical qubits comprising the set.

13. The system of claim 9, wherein the measurement arbitration component corrects one of the plurality of sets of logical qubits according to a set of logical rules, at least one of the logical rules evaluating a number of corrected qubits recorded at one of the qubit sets.

14. The system of claim 13, wherein the plurality of qubits sets comprises three qubit sets, each containing three qubits, and the set of logical rules comprises correcting a one of first and second sets of the plurality of sets of logical qubits that contains only one logical qubit unless the qubit set associated with the one logical qubit contained no corrected qubits and each of the two qubit sets associated with the other of the first and second sets of logical qubits contained a corrected qubit.

15. The system of claim 9, the plurality of logical qubits comprising a first set of first-level logical qubits of a plurality of sets of first-level logical qubits, and the measurement arbitration component further being configured to record a number of corrected first-level logical qubits at each set of first-level logical qubits, with each set of first-level logical qubits corresponding to an associated second-level qubit, determine a first set of second-level logical qubits having a first state and a second set of second-level logical qubits having a second state, and correct one of the first set of second-level logical qubits and the second set of second-level logical qubits according to the recorded numbers of corrected first-level logical qubits.

16. The system of claim 9, wherein the measurement arbitration component determines a first set of the plurality of logical qubits having a first state and a second set of the plurality of logical qubits having a second state by entangling a qubit from each qubit set with at least one of a set of ancillary qubits that are not part of the plurality of qubit sets and measuring each of the set of ancillary qubits.

17. The system of claim 9, wherein the error correction component performs an error correction on a qubit set of the plurality of qubit sets by determining a first set of qubits from a plurality of qubits in the qubit set having a first state and a second set of qubits from the plurality of qubits having a second state and correcting the one of the first set of qubits and the second set of qubits having fewer qubits.

18. A method for quantum error correction comprising:
performing a first error correction on each of a plurality of qubit sets, each qubit set representing an associated logical qubit of a plurality of logical qubits;
determining a first set of the plurality of logical qubits having a first state and a second set of the plurality of logical qubits having a second state, the first set of logical qubits being larger than the second set; and
correcting the first set of logical qubits to the second state.

19. The method of claim 18, wherein determining a first set of logical qubits having a first state and a second set of logical qubits having a second state comprises entangling a qubit from each qubit set with at least one of a set of ancillary qubits that are not part of the plurality of qubit sets and measuring each of the set of ancillary qubits.

20. The method of claim 18, further comprising recording a number of qubits corrected in each qubit set during the first error correction.

* * * * *